United States Patent [19]
Domine et al.

[11] Patent Number: 5,949,419
[45] Date of Patent: Sep. 7, 1999

[54] WEB BROWSER DETECTION AND DEFAULT HOME PAGE MODIFICATION DEVICE

[76] Inventors: Robert M Domine, 41 S. Maine St., Kennebunkport, Me. 04046; Fred M Abaroa, P.O. Box 536, Kennebunk, Me. 04043

[21] Appl. No.: 08/854,697
[22] Filed: May 12, 1997

Related U.S. Application Data

[60] Provisional application No. 60/018,352, May 13, 1996.
[51] Int. Cl.⁶ ........................................................ G06F 3/00
[52] U.S. Cl. ............................................ 345/349; 709/220
[58] Field of Search ............................ 395/200.8, 200.5, 395/200.51, 200.52, 200.53, 349; 709/250, 220, 221, 222, 223

[56] References Cited

U.S. PATENT DOCUMENTS 5,737,560   4/1998   Yohanan ................................. 395/349

OTHER PUBLICATIONS

Web Page Scripting Techniques, Jason Bloomberg, Hayden Books 1996, ISBN 1–56830–307–6, 1996.

*Primary Examiner*—Ellis B. Ramirez
*Assistant Examiner*—William Titcomb
*Attorney, Agent, or Firm*—Allan Jacobson

[57] ABSTRACT

In a method and apparatus for use on the world wide web, a programmed digital computer detects one or more web browser programs and, responsive to the user, selectively modifies the default home page of the detected web browser program or programs. The user may indicate whether, and in which web browsers, the default home page setting is to be altered. In one embodiment, a floppy disk contains a program which scans the memory of the user's computer to detect one or more web browsers and automatically change the default home page web site setting in one or more of the detected web browsers. In a second embodiment, a program is downloaded over the internet which scans the memory of the user's computer to detect one or more web browsers and automatically change the default home page web site setting in one or more of the detected web browsers.

13 Claims, 2 Drawing Sheets

WEB BROWSER DETECTION AND DEFAULT HOME PAGE MODIFICATION DEVICE

This application claims benefit of provisional application 60/018,352 filed May 13, 1996.

FIELD OF THE INVENTION

The present invention relates to devices useful with Internet browser devices.

BACKGROUND OF THE INVENTION

The Internet is a world wide communication network, enabling computer users to connect to other computer users. Users on local area computer networks are also interconnected via the Internet to send and receive information to other users on other local area computer networks. The world wide web is the multi-media portion of the Internet which provides full color graphics and sound.

Using the Internet and accessing the world wide web, has been made easier by the proliferation of web browser programs. A web browser is a software utility device which provides the user with a simple graphical user interface to navigate the Internet. With a web browser, the user can navigate through the Internet by selecting options from icons and menus with a point and click mouse. Typically, a web browser, upon initially connecting to the Internet, begins at a selected initial web site (home page).

The typical web browser further includes a default setting by which the initial home page is selected. That is, the user selects any desired web site as a desired initial default home page. When the web browser connects to the Internet, the first internet connection is to the selected web site. However, most users do not change the initial home page default function. Publishers of web browsers typically either set the initial home page to their own web site, or provide a function by which the user may select the publisher's web site as the initial web site.

SUMMARY OF THE INVENTION

It is desirable to many internet participants having a site on the world wide web to have users to connect to their web site as the initial default home page, in order to increase traffic to their web site. Yet, many users leave the default home page web site on their web browser programs set to the web site of the web browser publisher.

The present invention is embodied in a method and apparatus to detect one or more web browser programs on a programmed digital computer and selectively modify the default home page of the detected web browser program or programs. The user may indicate whether, and in which web browsers, the default home page setting is to be altered.

In one embodiment, a floppy disk contains a program which scans the memory of the user's computer to detect one or more web browsers and automatically change the default home page web site setting in one or more of the detected web browsers.

In another embodiment, a program is downloaded over the internet which scans the memory of the user's computer to detect one or more web browsers and automatically change the default home page web site setting in one or more of the detected web browsers.

DETAILED DESCRIPTION

Software that is used to navigate the World Wide Web on the Internet is popularly known as a Web Browser. All Web Browsers have a designated Home Page which defines the initial Web Site connected to the Web Browser upon start up. All Web Browsers also possess the capability for the Home Page to be altered, which is the principle underlying the operation of the present invention. A device in accordance with the present invention detects a wide array of Web Browsers and change any or all of their Home Pages in response to user-specified instructions.

A program or device in accordance with the present invention has been termed a HOMER program or device, which is suggestive of its function to automatically change the home page of a Web Browser.

The HOMER device detects the residence, on a computing communications device that is equipped to exchange information using the electronic communications network known as the World Wide Web. The program indicates to the individual enabling the HOMER device that one or more Web Browsers have been detected, and further indicates precisely which Web Browsers have been detected, by indicating the common name of each Web Browser as it is used in commerce.

The individual enabling the HOMER device is given the YES/NO option of changing the Default Home Page of each Web Browser that is detected, where the default Home Page means the Site on World Wide Web to which each Web Browser automatically goes first, whenever the Web Browser is enabled, and the YES/NO option of changing the Default Home Page means that if the individual enabling the HOMER device indicates YES, then the Web Browser Default Home Page will be changed from its current value to a New Value. Further, if the individual enabling the HOMER device indicates NO, then the Web Browser Default Home Page will NOT be changed from its current value. Selecting the New Value of the Default Home Page means a value (that is, a Web Site) supplied by the HOMER device.

In addition to providing the YES/NO option to the individual enabling the HOMER device, the HOMER device will actually change each detected web browser's Default Home Page to the New Value, when the individual enabling the HOMER device responds YES.

Figure 1:
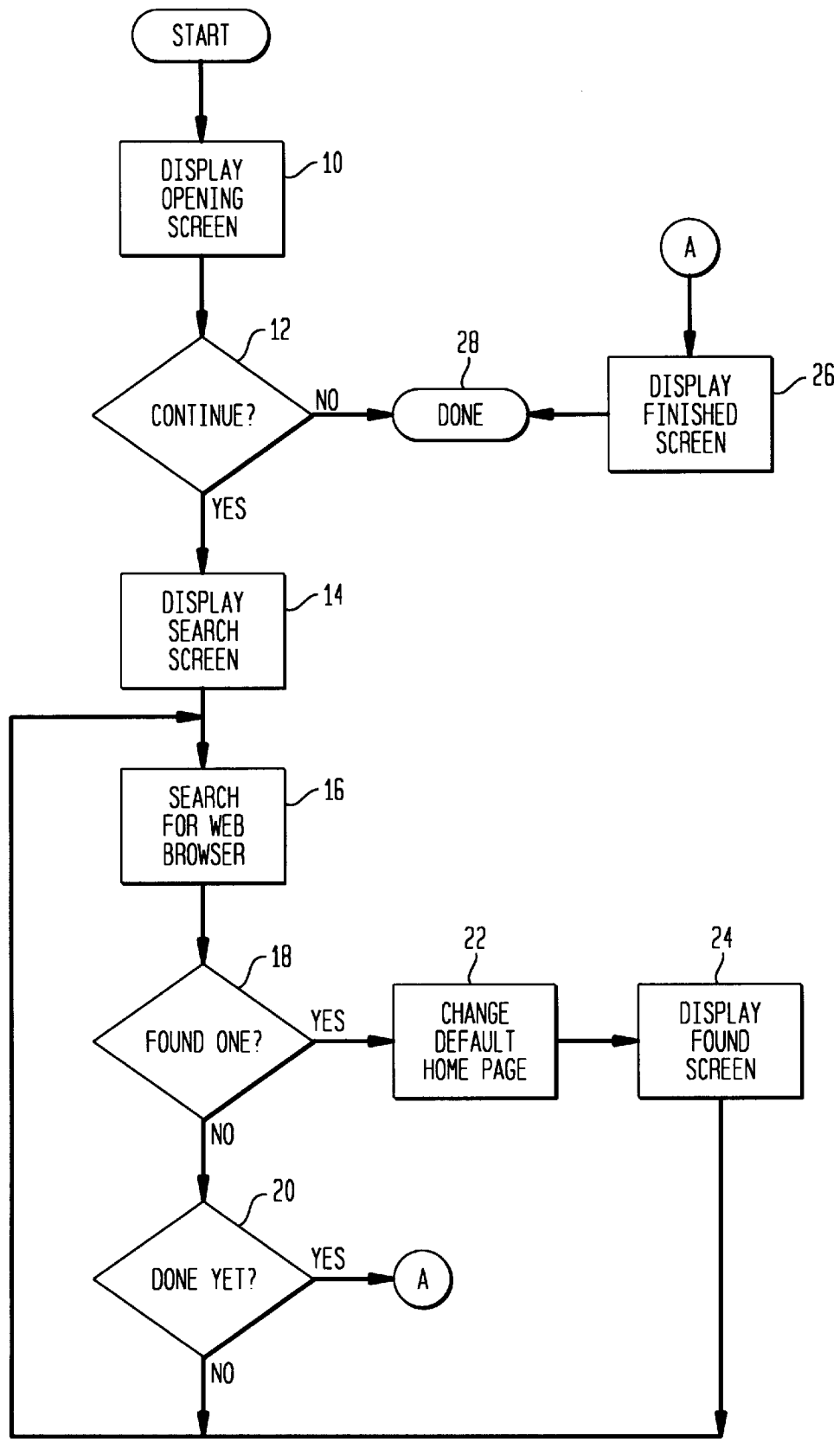
FIG. 1 is a flowchart diagram illustrating the general operation of the present invention.
Figure 2:
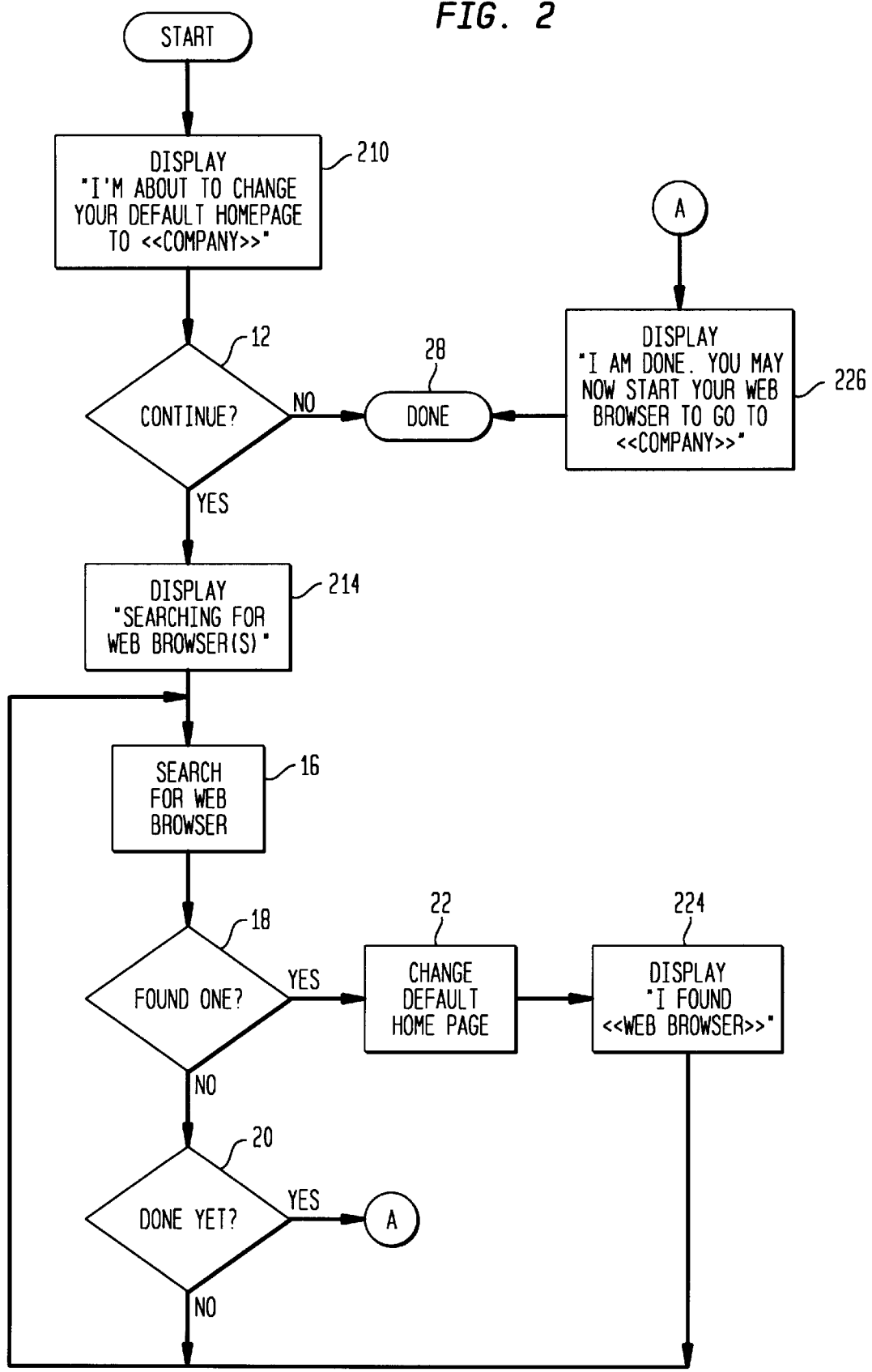
FIG. 2 is a flowchart diagram illustrating a specific embodiment of operation of the present invention.

A flow chart of a general and a specific HOMER program is shown in FIGS. 1 and 2 respectively. In FIG. 1, after the program starts, an opening screen display 10 gives the user a choice. In FIG. 2, the specific choice is an opening screen display 210 which says "I'm about to change your default Home Page to <<Company>>, where <<company>> is the web site to which the user is connected. If the user answers NO, the HOMER program is done, and exits at step 28.

If the user answers YES, a display search screen 14 in FIG. 1 is shown. In FIG. 2, the specific display search screen 214 says, "Searching for Web Browsers". The search for a Web Browser continues at step 16 until one is found at step 18. The Default Home Page is then changed at step 22 and a found screen is displayed at step 24. In FIG. 2, a specific found screen display is "I found <<web browser>>, where <<web browser>> is the name of the specific web browser found. If no further web browsers are found at step 18, the HOMER program tests whether it is done at step 20, and if not, the HOMER program then searches for another Web Browser at step 18.

If the HOMER program is done at step 20, a finished screen is displayed at step 26. In FIG. 2, the specific finished screen is "I am done. You may now start your web browser to go to <<company>>". Thereafter, the HOMER program is done and exits at step 28.

There are least two configurations for the HOMER device. In the first configuration, HOMER will actually change the Default Home Page of ALL detected Web Browsers. In the second configuration, HOMER will change the Default Home Page of detected Web Browsers on a Browser-by-Browser basis. That is, the individual enabling the HOMER device will, using the second configuration, have the option of maintaining the current Default Home Page for one or more of the detected Browsers, while changing the Default Home Page for one or more of the detected Browsers. In such event, step 22 will be conditioned on a user input before changing the default home page on a Browser-by-Browser basis.

The HOMER device can be delivered to a host computer communications device in at least two (2) ways:

1. Via floppy disk or CD-ROM. The device can be copied to floppy disk or CD-ROM and introduced into any computer/communications environment possessing the capability to read such input media. This includes all Intel-compatible CPU's (formerly IBM-compatible), running Microsoft DOS, Microsoft Windows, and Microsoft Windows 95 executables. It also includes all Apple Computer Macintosh machines.

2. Via the World Wide Web. The HOMER device can reside on the server used by a particular Web Site. A Button can be placed anywhere on the Web Site (probably in a prominent position on the Home Page). This Button will be labeled "If You Would Like to Make <WEBSITE> Your Default Home Page, Click Here" (or some similar language). Using a mouse input device to click on this button will cause the HOMER device to be downloaded from the Web Site server to the individual user's computer. How HOMER is activated once downloaded depends on the Web Browser that is used to perform the download function. Some Web Browsers are built to automatically open and execute any downloaded files. Other Web Browsers may be customized by their users to automatically open and execute any downloaded files.

If an individual user's Web Browser is configured to automatically open-and-run, then HOMER will download and immediately function as described in the first section of this document.

If an individual user's Web Browser is NOT configured to automatically open-and-run, then HOMER will download only. Running the device will occur in response to additional user supplied open and run commands. In this case, HOMER will also function as described in the first section of this document.

The principal use of the HOMER device in commerce is to encourage individuals who use the World Wide Web to make a particular Web Site their personal Home Page—that is, the Web Site at which they start browsing the Web. This is commercially desirable from the perspective of any particular Web Site because it has the effect of increasing traffic at that Web Site. The value of traffic to a Web Site is twofold:

First, increased traffic at a Web Site is directly related to that Site's ability to charge increased amounts for electronic advertising. That is, companies placing advertisements for their products and/or services want to receive the maximum amount of exposure. The HOMER device maximizes potential advertiser exposure at a particular Web Site by causing individuals to start each and every browsing session at that Site. HOMER—together with further individual customization of the HOMER-adopted Home Page—creates a "captive target market" for advertisers.

Second, certain Web Sites are currently or will eventually sell products and/or services over the World Wide Web. Increased exposure to potential customers is a primary means of increasing sales. Once again, the HOMER device maximizes potential consumer exposure to a company's products and/or services by causing individuals to start each and every browsing session at that company's Web Site.

In each case, the HOMER device provides only for the delivery of additional traffic to a Web Site. Over the long run, an individual will decide whether or not to maintain a Web Site as their personal Home Page, based on the quality and responsiveness to their personal needs of the content at that Site. An analogy may be made to television advertising. The quality of the content (the programming or the "shows") is completely responsible for the retention of a viewing audience, to which advertisers may pitch their products and/or services. To extend the analogy, HOMER has an effect on a Web Browser that can be likened to a television device that causes a viewer's set to always start at a predetermined broadcast station (for example). Obviously, such a device would be a boon to the predetermined broadcast station. And yet, the ability of the broadcast station to capitalize on such a device will depend on the extent to which it can retain its temporarily captured audience with programming viewers actually want to watch.

A program listing is set forth below:

```
/************************************************/
/*                                              */
/* Program: Homer.exe                           */
/* Purpose: To change the default homepage      */
/*    ini file of popular Web Browswers         */
/* Author: Fred M. Abaroa                       */
/* Date: 5-2-96                                 */
/* Company: Digital Research, Inc               */
/*                                              */
/************************************************/
#include <dos.h>
#include <stdlib.h>
#include <string.h>
#include <stdio.h>
#include <conio.h>
#include <iostream.h>
#include <splash.h>
#include <windows.h>
#include <mmsystem.h>
#include <bios.h>
#define cr 13
#define stack_size 200
char rpath[]="C:\\";
char dstack[stack_size][65];
int push_add=0;
struct find_t mybuf;
// File Search and Replace
// This routine will scan a DOS file searching and replacing
// matching text strings. The file to be opened will be specified
// on the command line, and the new file that will be created will
// be called FSR.NEW. After completing the operating and closing
// both files, the original file will be replaced and FSR.NEW will
// be renamed the same as the old file. As an Option you can pass
// argc[4] as the TempFile name and this will be used instead of
// FSR.NEW.
// Command Line:
   FILENAME SEARCHSTRING REPLACESTRING [TempFile]
// FSR.CPP - By Todd Osborne CIS ID: 71431,2243
// 09/16/93 - Compiled with Microsoft Visual C++ 1.00
// This source cade and program are Public Domain
// Feel free to copy and use this source code in other programs.
```

```
// Please let me know if you find any bugs or want improvements!!
// **** THIS PROGRAM IS CASE-SENSITIVE ****
// This code has been modified By Fred Abaroa
int Copy TextFile (char *SourceFile, char *destFile)
{
    // This routine copies TEXT files ONLY !!
    FILE *FPq, *FP2;
    char InString[256]="";
    if ( (FP1=fopen(SourceFile, "r")) != NULL )
    {
        //Open Output File
        if ( (FP=fopen(DestFile, "w")) == NULL )
        {
            fcloseall( );              // Something's Wrong!!
            return (0);
        }
        else
        // Process this file
            while ( (fgets (Instring, 256, FP1)) != NULL )
            {
                fputs (InString, FP2);
            }
        fcloseall( );
        return (1);
    }
    else return (0);
}
void ReplaceString (char *InString, char *SearchString, char *ReplaceStr)
{
    //Do the Actual String Replacement Here
    char NewString1[256]="";      // 1st Part of New String
    char NewString2[256]="";      // 2nd Part of New String
    char *loc="";
    int i;
    loc=strstr(InString, SearchString);
    i = loc - InString + 1;
    if (i==1)
    {
        strcpy (InString, "Home Page=http://www.disney.com\n"); // Combine
                                                                 these
                                                                 suckers
    }
}
int SileSearchAndReplace (char *FileName, char *SearchString,
char *ReplaceStr, char *TempFile)
{
    // Perform the File Search and Replace
    // Function returns 1 if successfull, 0 if not
    FILE *FP1, *FP2;              // File Pointer 1 (Open File) and
                                  2 (New File)
    char InString[256]="";
    char *loc="";
    if ( (FP1=fopen(FileName,
    "r")) != NULL )
    {
        //Open Output File
        if ( (FP2=fopen(TempFile, "w")) == NULL )
        {
            fcloseall( );        // Something's Wrong!!
            return (0);
        }
        // Process this file
        while ( (fgets (InString, 256, FP1)) != NULL )
        {
            //There may be more than one string in each line, so loop
            if ( (loc=strstr(InString, SearchString)) != NULL )
            {
                ReplaceString (InString, SearchString, ReplaceStr);
            }
            fputs (InString, FP2);   // Write modified line to new file
        }
        fcloseall( );        // Close open files
        // Copy File instead of rename. If you only rename it, the file
        // will exists in the same directory as FSR.EXE. We wnat it to
        // be placed in the same location it came from!
        CopyTextFile (TempFile, FileName);
        remove (TempFile);
        return (1);
    }
    else
    {
        //print("\nFile not found.\n");
        //cout << "\nFile not found.\n";
        return (0);
    }
}
/**********************************/
/*                                */
/* Print the data for the individual    */
/* file and repeat till done.           */
/*                                */
/**********************************/
void fnamesdis ( )
{
    int i,j;
    char c,temp[80];
    for (i=0;i<16;i++)
        temp[i] ='';
    i=0;
    for(j=0;j<=11;j++)          /* Put the ext at temp[10-12] */
    {
        c = mybuf.name[j];
        switch (c)
        {
            case :: i = 10;
                break;
            default :   temp[i+ ] = c;
                break
        }
    }
    temp[i] = 0;
    //cout << mybuf.name << "\n";
    //printf("\t%-13s\n",mybuf.name);
    //printf("\t%-13s",temp);
    //printf(" %8ld",mybuf.size);
}
/*************************************************/
/*                                               */
/* Subroutine:                    push(str)    */
/*                                               */
/* Works on the global array dstack and int push_add and    */
/* puts the passed string on the top of the stack. If       */
/* there is no space on the stack a -1 is returned.         */
/*                                               */
/*************************************************/
int push(char *spush)
{
    int i=0;
    if(push_add != stack_size) //stack_size
        strcpy(dstack[push_add++],spush);
    else
        i=-1;
    return(i);
}
/*************************************************/
/*                                               */
/* Subroutine:                    pop(str)     */
/*                                               */
/* Works on the global array dstack and int push_add and    */
/* gets the string on the top of the stack. If the stack    */
/* is empty, a -1 is returned.                              */
/*                                               */
/*************************************************/
int pop(char *spop)
{
    int i=0;
    if(push_add != 0)
        strcpy(spop,dstack[--push_add]);
    else
        i=-1;
    return(i);
}
/*************************************************/
/*                                               */
/* This program will search down in a path for a file       */
/* dos wildcards are allowed in the filespec.               */
/*                                               */
/*                                               */
/*************************************************/
void Main( )
```

```
{
  int i,dircnt=0,filecnt=0,newpath,sort_flag=0;
  int specs=1,nopush=0,find_one=0,nosub=0,dirfnd=0;
  char temp[80],path[80],temp2[80],ch;
int NumOfBrowsers=3;
char Browser[3][15]={"c:\\","NETSCAPE.INI","AIRMOS.INI"};
MSG msg;
  sndPlaySound("Dropflag.wav",SND_SYNC);
  ShowSplashFromFile("disney.bmp",0);
  while (GetMessage(&msg,     /* message structure               */
      NULL,      /* handle of window receiving the message */
      NULL,      /* lowest message to examine       */
      NULL))     /* highest message to examine      */
  }
  TranslateMessage(&msg);    /* Translates virtual key codes    */
  DispatchMessage(&msg);     /* Dispatches message to window    */
  }
/* do
  {
    //cin.get(ch);
    ch = getc(stdin);
    //ch = _bios_keybrd(_KEYBRD_READ);
    ch = toupper(ch);
  } while( ch != 'Y' && ch != 'N');
  if (ch=='N')
  {
    EndSplash( );
    exit(0);
  }
*/
  EndSplash( ); //take off first bmp
  ShowSplashFromFile("sitback.bmp", 2);
  sndPlaySound("Sitback.wav",SND_SYNC);
  /****************************************************/
  /*                                                  */
  /* This program works by keeping a stack of paths to */
  /* check for the given spec(s). The start_path is pushed */
  /* initially and after it is checked for files it is */
  /* then checked for directories to also be pushed on the */
  /* path.stack. The start_path must be given on the  */
  /* command line.                                    */
  /*                                                  */
  /****************************************************/
if(nopush == 0)
  {
  if(push(Browser[specs - 1]) == -1)
      {
      //cout << "Internal stack error, too many directories\n";
      //printf("Internal stack error, too many directories\n");
      exit(4);
      }
  }
else
  specs--; /* There is no start_path with -r option */
/****************************************************/
/*                                                  */
/* Remove the paths from the stack one at a time,   */
/* usually this means the stack will be empty after the */
/* first call. More paths will be added if the popped */
/* path has subdirectories.                         */
/*                                                  */
/****************************************************/
while(pop(path) != -1)
  {
  newpath = 0;   /* Flag to show when 1st match is found*/
  dircnt++;
  /****************************************************/
  /*                                                  */
  /* While we are looking at this directory, check for */
  /* each spec given on the command line.            */
  /*                                                  */
  /****************************************************/
  for(i=specs;i<NumOfBrowsers;i++)
    {
      strcpy(temp,path);
      strcat(temp,Browser[i]);
      //printf("line 239--%s--\n",temp);
      if(_dos_findfirst(temp,_A_NORMAL | _A_RDONLY,
        &mybuf) == 0)
      {
```

```
      if(newpath == 0)
      {
      /****************************************************/
      /*                                                  */
      /* First file is found for this path, so            */
      /* print the path.                                  */
      /*                                                  */
      /****************************************************/
      //cout << path << "\n";
      //printf("%s\n",path);
      dirfnd++;
      newpath = 1;
      }
      do
      {
        filecnt++;
        fnamedis( ); /* Display the file */
        if (filecnt>1)
        {
          if (strcmp(Browser[1],mybuf.name)==0)
          {
            EndSplash( ); //take off first bmp
            ShowSplashFromFile("Netscape.bmp", 0);
          }
          else
          {
            EndSplash( ); //take off first bmp
            ShowSplashFromFile("Mosaic.bmp", 0);
          }
          sndPlaySound("Foundit.wav",SND_SYNC);
        }
        else
        {
          if(strcmp(Browser[1],mybuf.name)==0)
          {
            EndSplash( ); //take off first bmp
            ShowSplashFromFile("Netscape.bmp", 0);
          }
          else
          {
            EndSplash( ); //take off first bmp
            ShowSplashFromFile("Mosaic.bmp", 0);
          }
          sndPlaySound("Found1.wav",SND_SYNC);
        }
        //FileSearchAndReplace (char *FileName,
          char *SearchString,
          char *ReplaceStr, char *TempFile)
        strcpy(temp2,path);
        strcat(temp2,mybuf.name);
        //cout << temp2 << "\n";
        //printf("*%s*\n*%s*\n\n",Browser[1],mybuf.name);
        FileSearchAndReplace (temp2,
          "Home Page=", "http://www.disney.com", "fsr.new");
        }
        while(_dos_findnext(&mybuf) == 0);
      }
    }
if(nosub == 0) /* if doing path search - no subs */
  {
  /****************************************************/
  /*                                                  */
  /* Prepare to look for sub directories under the    */
  /* current path.                                    */
  /*                                                  */
  /****************************************************/
  strcpy(temp,path);
  strcat(temp,"*.*");
  if(_dos_findfirst(temp,_A_SUBDIR,&mybuf) == 0)
    do
    if(((mybuf.attrib & _A_SUBDIR) != 0) && (mybuf.name[0] != '.'))
      {
      /****************************************************/
      /*                                                  */
      /* Since we know it is a real sub directory         */
      /* push it on the stack and look for more.          */
      /*                                                  */
      /****************************************************/
      strcpy(temp,path);
      strcat(temp,mybuf.name);
```

-continued

```
        strcat(temp,"\\");
        if(push(temp) == -1)
            {
            //cout << "Internal stack error, too many directories\n";
            exit(4);
            }
        }
        while(_dos_findnext(&mybuf) == 0);
        }
    }
    //cout << dircnt << "directories searched,"
        << filecnt << "matches found in" << dirfnd << "directories.\n";
    EndSplash( );
    ShowSplashFromFile("done.bmp", 10);
    EndSplash( );
    sndPlaySound("Dropflag.wav",SND_SYNC);
    exit(0);
}
```

What is claimed is:

1. In a communication network with a programmed digital computer including a memory containing at least one world wide web browser program for communicating via the internet to a world wide web site, said world wide web browser program having a default home page designation, a method for modifying said default home page designation in said world wide web browser program, said method comprising:

providing a display indication on said world wide web site of a choice to modify said default home page of said world wide web browser program to a predetermined default home page designated on said world wide web site;

indicating at said programmed digital computer containing said world wide web browser program that said predetermined default home page designated on said world wide web site is selected as the default home page designation for said world wide web browser program;

downloading a home page modification program from said world wide web site to said programmed digital computer, said home page modification program further including the steps of;

determining the existence of said world wide web browser program in said memory;

determining the location of the default home page designation in said particular world wide web browser program to provide a determined default home page memory location; and storing said predetermined default home page designation in said determined default home page memory location.

2. A method in accordance with claim 1, wherein said step of determining the existence of a particular web browser comprises scanning said memory to automatically detect the existence of said particular world wide web browser.

3. A method in accordance with claim 1, wherein said step of determining the existence of a particular web browser comprises manually selecting said particular world wide web browser.

4. In a communication network with a programmed digital computer including a memory containing a world wide web browser program coupled via the internet to a world wide web site, said world wide web browser program having a default home page designation, a method for modifying said default home page designation in said world wide web browser program, said method comprising:

providing a display indication on said world wide web site of a choice to modify said default home page of said world wide web browser program to a predetermined default home page designated on said world wide web site;

indicating at said programmed digital computer containing said world wide web browser program that said predetermined default home page designated on said world wide web site is selected as the default home page designation for said world wide web browser program; and downloading a home page modification program from said world wide web site to said programmed digital computer, said home page modification program further including the step of storing said world wide web site as said predetermined default home page designation in said world wide web browser program.

5. In a communication network with a programmed digital computer including a memory containing at least one world wide web browser program for communicating via the internet to a world wide web site, said world wide web browser program having a default home page designation, an apparatus for modifying said default home page designation in said world wide web browser program, said apparatus comprising:

means for providing a display indication on said world wide web site of a choice to modify said default home page of said world wide web browser program to a predetermined default home page designated on said world wide web site;

means for indicating at said programmed digital computer containing said world wide web browser program that said predetermined default home page designated on said world wide web site is selected as the default home page designation for said world wide web browser program; and means for downloading a home page modification program from said world wide web site to said programmed digital computer, said home page modification program further including;

means for determining the existence of said world wide web browser program in said memory;

means for determining the location of the default home page designation in said particular world wide web browser program to provide a determined default home page memory location; and means for storing said predetermined default home page designation in said determined default home page memory location.

6. An apparatus in accordance with claim 5, wherein said means for determining the existence of a particular web browser comprises scanning said memory to automatically detect the existence of said particular world wide web browser.

7. An apparatus in accordance with claim 5, wherein said means for determining the existence of a particular web browser comprises manually selecting said particular world wide web browser.

8. In a communication network with a programmed digital computer including a memory containing a world wide web browser program coupled via the internet to a world wide web site, said world wide web browser program having a default home page designation, an apparatus for modifying said default home page designation in said world wide web browser program, said apparatus comprising:

means for providing a display indication on said world wide web site of a choice to modify said default home page of said world wide web browser program to a predetermined default home page designated on said world wide web site;

means for indicating at said programmed digital computer containing said world wide web browser program that said predetermined default home page designated on said world wide web site is selected as the default home page designation for said world wide web browser program; and means for downloading a home page modification program from said world wide web site to said programmed digital computer, said home page modification program further including means for storing said world wide web site as said predetermined default home page designation in said world wide web browser program.

9. A computer program product for use in a programmed digital computer including a memory containing at least one world wide web browser program for communicating via the internet to a world wide web site, said world wide web browser program having a default home page designation, said computer program product responsive to a user indication for modifying said default home page designation in said world wide web browser program, said computer program product comprising:

a computer readable medium containing an executable program for setting the default home page designation of a world wide web browser program to a predetermined world wide web site, said executable program comprising:

a first program code means for displaying an indication to said user to enable said user to choose whether said predetermined world wide web site is to be designated as the default home page designation of said world wide web browser program, said first program code means further including code means for determining the existence of said world wide web browser program in said memory and the location of the default home page designation in said particular world wide web browser program; and a second program code means, responsive to a choice by said user, for storing said predetermined default home page designation in said default home page memory location.

10. A computer program product in accordance with claim 9, wherein said first program code means includes program code means for determining the existence of a predetermined web browser program by scanning said memory to automatically detect the existence of said predetermined world wide web browser program.

11. A computer program product in accordance with claim 9, wherein said second program code means includes program code means for determining the existence of a plurality of web browser programs and indicating to said user to manually select one or more of said plurality of world wide web browser programs.

12. In a world wide web site coupled via the internet to a programmed digital computer including a memory containing a world wide web browser program, said world wide web browser program having a default home page designation, a method for modifying said default home page designation in said world wide web browser program from said world wide web site, said method comprising:

providing a display on said world wide web site indicating a choice to modify said default home page of said world wide web browser program to a predetermined default home page designated on said world wide web site; and downloading, responsive to an indication of choice from said programmed digital computer, a home page modification program from said world wide web site to said programmed digital computer, said home page modification program including the step of storing said predetermined default home page designation in said world wide web browser program.

13. In a world wide web site coupled via the internet to a programmed digital computer including a memory containing a world wide web browser program, said world wide web browser program having a default home page designation, an apparatus for modifying said default home page designation in said world wide web browser program from said world wide web site, said apparatus comprising:

means for providing a display on said world wide web site indicating a choice to modify said default home page of said world wide web browser program to a predetermined default home page designated on said world wide web site; and means for downloading, responsive to a display indication of choice from said programmed digital computer, a home page modification program from said world wide web site to said programmed digital computer, said home page modification program including means for storing said predetermined default home page designation in said world wide web browser program.

* * * * *